Dec. 4, 1951  R. F. E. STEGEMAN  2,577,380
SPECTACLE FRAME WITH NONMETALLIC PARTS ON RIMS
Filed Dec. 7, 1949
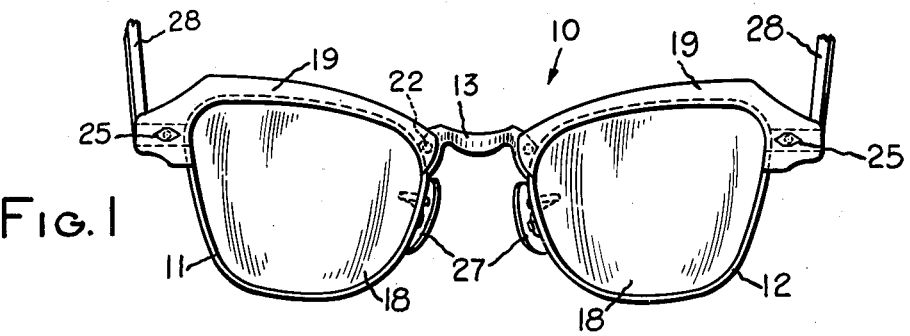
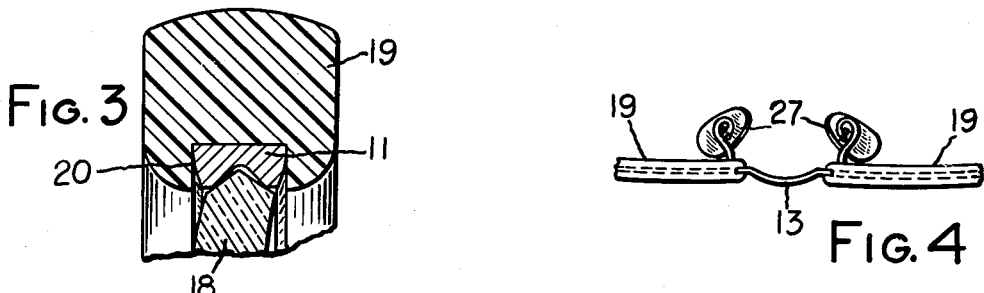
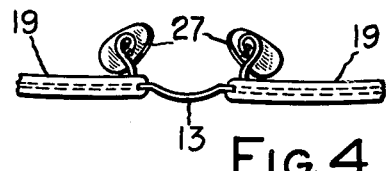
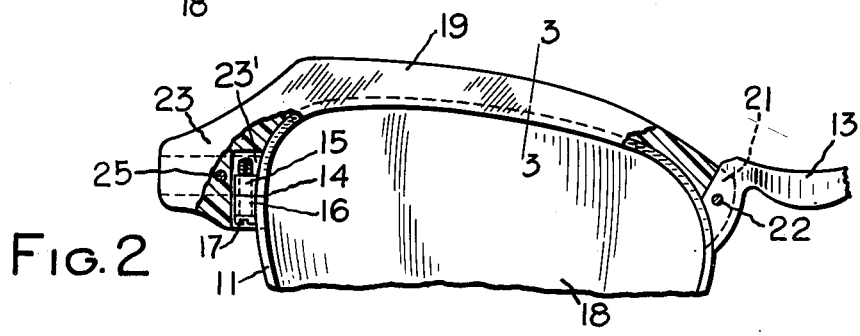
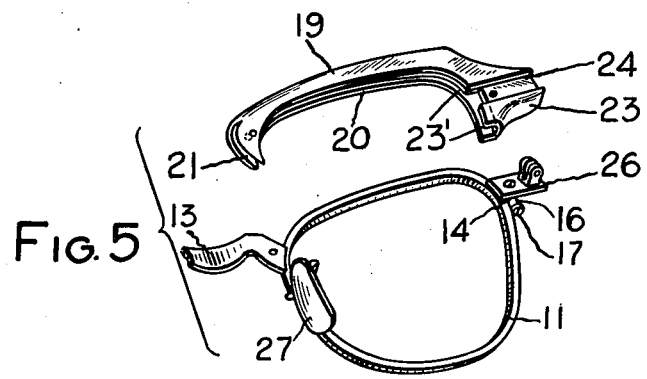
INVENTOR.
R.F.E. STEGEMAN
BY
ATTORNEY Patented Dec. 4, 1951

2,577,380

UNITED STATES PATENT OFFICE 2,577,380

SPECTACLE FRAME WITH NONMETALLIC PARTS ON RIMS

Raymond F. E. Stegeman, Greece, N. Y., assignor to Bausch & Lomb Optical Company, Rochester, N. Y., a corporation of New York Application December 7, 1949, Serial No. 131,625

3 Claims. (Cl. 88—41)

This invention relates to spectacle frames and more particularly it has reference to such frames which embody the combination of a metallic front and non-metallic parts.

One of the objects of this invention is to provide an improved spectacle frame of the type described which will be durable in construction and efficient in operation. A further object is to provide such a spectacle frame having improved means for securing the non-metallic parts to the metallic parts. Another object is to provide in such a frame an improved connection between the metallic and non-metallic parts which will facilitate the removal or insertion of lenses.

These and other objects and advantages reside in certain novel features of construction, arrangement, and combination of parts as will be hereinafter more completely described and pointed out in the appended claims:

Referring to the drawings:

Fig. 1 is a front view of a spectacle frame embodying my invention.

Fig. 2 is an enlarged fragmentary view of the upper portion of the frame, with parts shown in section.

Fig. 3 is a sectional view taken on line 3—3 of Fig. 2.

Fig. 4 is a fragmentary top view of the frame.

Fig. 5 is a fragmentary view of one lens rim showing the metal and non-metallic parts in separated relation.

A preferred embodiment of my invention is disclosed in the drawings wherein 10 indicates, generally, a spectacle frame having the two metallic lens rims 11 and 12 connected, as by soldering, to the bridge 13. Each lens rim is split at its temporal side as shown at 14 and the upper and lower connecting barrels 15 and 16 are secured, respectively, to the adjacent ends of each lens rim so that by means of screws 17 the lenses 18 are detachably held in the grooved lens rims 11 and 12.

A non-metallic rim part 19, formed of a suitable non-metallic plastic material, extends along the top of each lens rim from the bridge to the connecting barrels on the temporal side. Each rim part 19 has an internal groove 20 within which the lens rim is seated. Formed in the nasal portion of each rim part is a slot 21 which intersects the groove 20 and is adapted to receive a portion of bridge 13 which is secured in the slot by a rivet 22. The temporal portion of the rim part 19 has the integral extension 23 which has the enlarged recess 23' in which the barrel connectors 15 and 16 are located and the extension also is provided on its rear face with a recess 24 which intersects the groove 20. Secured within the recess 24 by means of rivet 25 is the hinge plate 26 which is soldered to the rear face of the upper barrel connector 15. The usual nose pads 27 are secured to the nasal sides of the lens rims while temples 28 are hinged to the plates 26 in the usual manner.

From the foregoing it will be apparent that I am able to attain the objects of my invention and provide an improved spectacle frame embodying metallic and non-metallic parts. With my structure, the lenses are firmly but detachably held in metallic rims which completely surround the lenses. The non-metallic rim parts 19 are anchored to the metallic frame parts by means of the slots 21 and the hinge plates 26 which are held in the recesses 24. Since the recesses 24 intersect the grooves 20, the upper and lower barrel connectors are concealed by the non-metallic material. Hence, an efficient, neat-appearing structure is provided and a minimum number of rivets is required for holding the rim parts 19 to the metallic parts of the frame.

Various modifications can, obviously be made without departing from the spirit of my invention as pointed out in the appended claims.

I claim:

1. In a spectacle frame, the combination of a pair of spaced metallic lens rims adapted to surround lenses, a metallic bridge connecting the lens rims, said lens rims being split at their temporal sides and having upper and lower barrel connectors secured to the respectively adjacent ends of the rims, a pair of non-metallic rim parts extending along the upper and temporal portions of the respective lens rims and terminating at the bridge, said rim parts having internal grooves within which the lens rims are seated and having at the temporal ends of the grooves enlarged recesses within which the barrel connectors are positioned, the nasal ends of the rim parts having slots within which the sides of the bridge are respectively secured, said rim parts having integral temporal extensions provided on their rear faces with recesses which intersect the grooves, hinge plates secured within the respective last named recesses, said hinge plates being secured to the upper barrel connectors on the lens rims, and the barrel connectors being concealed within the enlarged recesses of the grooves whereby said rim parts are secured to the lens rims.

2. In an ophthalmic mounting having a metallic bridge connecting a pair of metal lens rims which are split at their temporal sides and have upper and lower barrel connectors secured to the respectively adjacent ends of the rims, the combination of a pair of non-metallic rim parts extending respectively, along the upper parts of said rims and terminating at the bridge, each of said parts having a slot formed in its nasal portion, the two sides of the bridge being positioned, respectively, within the slots, the sides of the bridge being secured to the rim parts, said rim parts having grooves intersecting the nasal slots, the lens rims being positioned, respectively, in said grooves, said rim parts having temporal extensions, said temporal extensions having enlarged recesses at the temporal end of the grooves, the rear faces of the extensions having recesses intersecting the grooves, plates secured to the extensions within the last named recesses, the upper barrel connectors being secured to the plates, the lower and upper barrel connectors being concealed within the enlarged recesses, whereby the rim parts are secured to the lens rims.

3. An ophthalmic mounting comprising a pair of metal lens rims, a metal bridge, the ends of the bridge being soldered, respectively, to the nasal sides of the lens rims, a non-metallic rim part extending along the top and down the temporal side of each lens rim, each rim part having on its under side an internal groove in which the lens rim is seated, each rim part terminating at the side of the bridge adjacent to it, each rim part having in its nasal end a slot in which the adjacent side of the bridge is positioned and secured, said lens rims being split at their temporal portions, upper and lower barrel connectors soldered, respectively, to the upper and lower ends of the split lens rims, each rim part terminating in a temporal extension having an enlarged recess at the temporal end of the groove, said extension also having on its rear surface a recess which intersects the groove, a hinge plate secured within each last named recess, the upper barrel connectors being soldered to the rear surfaces of the hinge plates, said connectors being positioned within said enlarged recesses, and a screw for clamping together each pair of barrel connectors whereby lenses may be detachably held in the lens rims.

RAYMOND F. E. STEGEMAN.

REFERENCES CITED

The following references are of record in the file of this patent:

UNITED STATES PATENTS

| Number | Name | Date |
|---|---|---|
| 1,515,624 | Schumacher et al. | Nov. 18, 1924 |
| 1,764,495 | Beattey | June 17, 1930 |
| 2,284,630 | Banks | June 2, 1942 |
| 2,384,867 | Williams | Sept. 18, 1945 |
| 2,450,711 | Bouchard | Oct. 5, 1948 |
| 2,495,508 | Cleaver | Jan. 24, 1950 |